(12) United States Patent
Guichard et al.

(10) Patent No.: US 11,133,509 B2
(45) Date of Patent: Sep. 28, 2021

(54) GRID CURRENT COLLECTOR AND ASSOCIATED DEVICES AND METHODS

(71) Applicant: ARMOR, Nantes (FR)

(72) Inventors: Pierre Guichard, Reze (FR); Simon Berthome, Saint-Hilaire-de-Riez (FR)

(73) Assignee: ARMOR, Nantes (FR)

( * ) Notice: Subject to any disclaimer, the term of this patent is extended or adjusted under 35 U.S.C. 154(b) by 174 days.

(21) Appl. No.: 16/502,763

(22) Filed: Jul. 3, 2019

(65) Prior Publication Data
US 2020/0014032 A1    Jan. 9, 2020

(30) Foreign Application Priority Data
Jul. 5, 2018   (FR) ...................................... 18 56207

(51) Int. Cl.
| | |
|---|---|
| *H01M 4/66* | (2006.01) |
| *H01G 11/32* | (2013.01) |
| *H01G 11/46* | (2013.01) |
| *H01G 11/48* | (2013.01) |
| *H01G 11/66* | (2013.01) |
| *H01G 11/84* | (2013.01) |

(52) U.S. Cl.
CPC ............ *H01M 4/668* (2013.01); *H01G 11/32* (2013.01); *H01G 11/46* (2013.01); *H01G 11/48* (2013.01); *H01G 11/66* (2013.01); *H01G 11/84* (2013.01); *H01M 4/661* (2013.01); *H01M 4/667* (2013.01)

(58) Field of Classification Search
CPC .............................. H01M 4/667; H01M 4/668
USPC ......................................................... 429/234
See application file for complete search history.

(56) References Cited

U.S. PATENT DOCUMENTS

| 5,554,459 | A | 9/1996 | Gozdz |
| 9,142,811 | B2 | 9/2015 | Chami |
| 2009/0311587 | A1 | 12/2009 | Best |
| 2013/0143126 | A1 | 6/2013 | Jung |
| 2014/0377619 | A1 | 12/2014 | Kwon et al. |
| 2017/0271678 | A1* | 9/2017 | Yang ..................... H01M 4/134 |
| 2018/0175433 | A1* | 6/2018 | Zhamu .................. H01M 4/661 |

FOREIGN PATENT DOCUMENTS

WO    2011157751 A1    12/2011

OTHER PUBLICATIONS

Search Report and Written Opinion for French Application No. FR 18 56207 dated May 16, 2019.

* cited by examiner

*Primary Examiner* — James M Erwin
(74) *Attorney, Agent, or Firm* — Pearne & Gordon LLP

(57) ABSTRACT

The present invention relates to a current collector comprising: a substrate, the substrate being made of a first material, the first material comprising a polymer, and a grid in contact with the substrate, the grid being made of a second material, the second material comprising metal particles.

15 Claims, 2 Drawing Sheets

GRID CURRENT COLLECTOR AND ASSOCIATED DEVICES AND METHODS

This patent application claims the benefit of document FR18/56207 filed on Jul. 5, 2018 which is hereby incorporated by reference.

FIELD OF THE INVENTION

The present invention relates to a current collector. The invention also relates to an assembly, an electrochemical accumulator or a supercapacitor comprising such a current collector. The invention also provides methods for manufacturing the current collector.

BACKGROUND OF THE INVENTION

An electrochemical accumulator typically comprises at least four elements: a positive electrode, a negative electrode, an electrolyte, as well as current collectors for each electrode. The assembly comprising a negative electrode and a current collector forms an anode while the assembly comprising a positive electrode and a current collector forms a cathode.

The operating principle of these accumulators is based on the reversible storage of electrical energy into chemical energy by the effective implementation of two electrochemical reactions that are separate and coupled. It is the positive and negative electrodes that are immersed in the electrolyte which serve as the seat of the electrochemical reactions referred to as faradic reactions. The electrodes are notably made of active materials that make it possible to store and release the ions via the oxidation and reduction reactions.

During the discharge, the active material at the negative electrode is oxidised and releases on the one hand, the electrons that are routed by the intermediate of the current collector to the external circuit, and on the other hand, the cations that migrate through the electrolyte towards the positive electrode. Then, the electrons that have passed through the circuit that used the energy therefrom, and the cations are captured by the active material at the positive electrode that is reduced. The energy density that an accumulator can release is a function of both the potential and the capacity of the electrochemical cell, both of which are directly related to the chemistry of the system. The potential of a battery is determined by the difference between the potentials of the oxidation-reduction reactions that occur simultaneously at the positive and negative electrodes.

Due to the development of batteries, for a number of applications, it is desirable to improve both the conductivity of batteries as well as their durability over time.

For this, the production of each part of a battery should be improved.

Generally, a current collector is made of a material that is sufficiently conductive to ensure electronic transport, which is also lightweight, thin, and mechanically resistant in order to serve as a substrate for the electrode. For example, the current collector is a metal sheet made of iron, copper, aluminium, nickel, titanium or stainless steel or other associated alloys.

However, the thickness of the metal collectors is generally limited by their flexibility and mechanical properties during large-scale coatings and calendaring for the production of accumulator electrodes or supercapacitors. In addition, such collectors can break, wrinkle, or tear under these conditions of use, which makes their production difficult.

SUMMARY OF THE INVENTION

There exists a need for current collectors for accumulators that are easier to manufacture.

To this end, a current collector is provided. The current collector comprising a substrate, the substrate being made of a first material, the first material comprising a polymer, and a grid in contact with the substrate, the grid being made out of a second material, the second material comprising metal particles.

According to specific embodiments, the current collector comprises one or more of the following features, taken into consideration in isolation or in accordance with any technically possible combination:
- the second material consist in at least particles.
- the second material comprises at least a polymer and particles.
- the second material consists of at least a polymer and particles.
- the second material comprises at least a binder and particles.
- the second material consists of at least a binder and particles.
- the second material comprises particles dispersed in at least a binder.
- the second material consists of particles dispersed in at least a binder.
- the second material comprises at least one element selected from the list consisting of electrically conductive metals and alloys, in particular gold, silver, copper, aluminium, nickel, palladium, platinum and titanium; and metal oxides such as indium tin oxide, fluorinated tin oxide, tin oxide and zinc oxide.
- the grid is constituted by the repetition of a pattern;
- the current collector further comprises a coating layer, the coating layer being in contact with the grid and forming a stack of layers superposed with the substrate along a stacking direction.
- the coating layer is made according to a second composition, the second composition comprising of a conductive material and a binder material, the conductive material comprising at least one element selected from the list consisting of carbon, carbon black, graphite, graphene, a carbon nanotube, an activated carbon fiber, a non-activated carbon nanofiber, a metal flake, a metal powder, a metal fiber, and an electrically conductive polymer.
- the content by weight of binder material is greater than or equal to 30%, preferably less than 80%.
- the content by weight of conductive material is greater than or equal to 20%, preferably less than 70%.
- the binder material consists of one or more polymers;
- the entire assembly of the coating layer and the grid has a thickness that is less than or equal to 15 micrometers, preferably less than or equal to 3 micrometers;
- the stack constituted by the grid and the coating layer has a thickness that is less than or equal to 15 micrometers, preferably less than or equal to 3 micrometers.
- the first material is selected from the group consisting of a polymer comprising at least one amide functional group; a polymer comprising at least one imide functional group; a polymer comprising at least one imide functional group and one amide functional group; poly(phenylene ether ether ketone); and poly(ethylene naphthalate).

The present description also relates to an assembly forming an anode or a cathode comprising an electrode, and a current collector as previously described above.

The present description also relates to an energy storage device for storing electrical energy, electrochemical accumulator or supercapacitor, comprising an assembly as previously described above.

Also proposed is a method for manufacturing a current collector including a step of providing a substrate, the substrate being made of a first material, the first material comprising a polymer, and a step of depositing a grid in contact with the substrate, the grid being made of a second material, the second material comprising of metal particles.

According to specific embodiments, the method for manufacturing includes one or more of the following features, taken into consideration in isolation or in accordance with any technically possible combination:
 the method includes an additional step for depositing a layer of coating in contact with the grid, the coating layer being formed by depositing a composition comprising of a conductive material and a binder material.
 at least one of the depositing steps carried out by a printing technique.

BRIEF DESCRIPTION OF THE DRAWINGS

Other features and advantages of the invention will become apparent upon reading the description that follows, of the embodiments of the invention, given by way of example only, and with reference being made to the accompanying drawings in which.

DETAILED DESCRIPTION OF EMBODIMENTS

Figure 1:
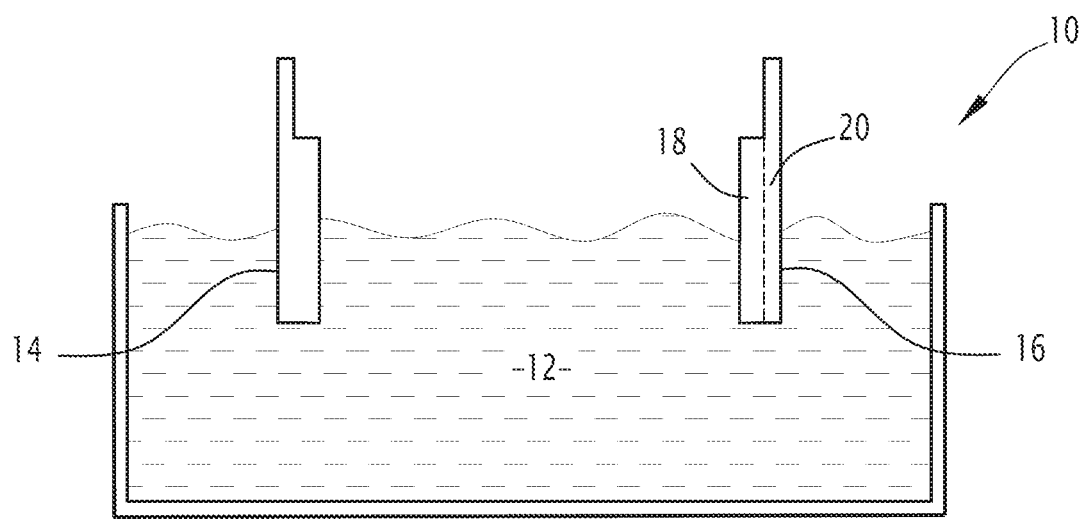
FIG. 1 is a schematic view of an example of an accumulator.

An electric accumulator 10 is represented in FIG. 1.

The accumulator 10 is intended to be connected to other electric accumulators to form an electrical generator of desired voltage and capacitance. Such a generator is referred to as an accumulator battery or simply a battery.

An accumulator 10 uses a reversible energy conversion technique in order to store energy and release it subsequently.

The accumulator 10 described uses an electrochemical reaction, the accumulator 10 is an electrochemical accumulator.

In the example provided, the accumulator 10 is a lithium-ion accumulator intended for a lithium-ion battery.

By way of a variant, the accumulator 10 corresponds to another technology and is an accumulator of the type: Lead-Acid, Nickel-Cadmium (NiCd), Nickel-Metal Hydride (NiMH), Nickel-Zinc (NiZn), Sodium-Sulphur (Na S), Sodium-Ion (Na-ion), Lithium Metal Polymer (LMP), Lithium-Polymer (Li—Po), Lithium-Sulphur (Li—S), or Nickel-Lithium (Ni—Li). Such a list is intended to be non limiting.

In the case of FIG. 1, the accumulator 10 comprises an electrolyte 12, an anode 14 and a cathode 16.

The interaction between the electrolyte 12, the anode 14 and the cathode 16 makes it possible for the accumulator 10 to operate as an electrochemical accumulator.

The electrolyte 12 is composed of different ionic salts bringing ions that are used for faradic or charge storage reactions, of carbonates and of a solvent or solvent mixture to enable the solubilisation of ions.

In a lithium-ion accumulator, the ionic salts are, for example, Lithium hexafluorophosphate ($LiPF_6$), the salt of Lithium bis(trifluoromethane sulfonyl), the Imide (LiTFSI), Lithium tetrafluoroborate ($LiBF_4$), and Lithium bis (oxalate) borate (LiBOB), Lithium difluoro(oxalato)borate (LiDFOB).

The carbonates are, for example, propylene carbonate (PC), ethylene carbonate (EC), dimethyl carbonate (DMC), ethyl methyl carbonate (EMC) or diethyl carbonate (DEC).

It is also possible to find, in a smaller proportion, methyl acetate or methyl formate, acetonitrile, tetrahydrofuran, or gamma-butyrolactone, and binary or ternary or even quaternary mixtures of the latter, as well as ionic liquids.

In the following, only the cathode 16 is more specifically described with the understanding that all of the elements described are also equally valid for the anode 14 by adapting only the composition of the anode.

The cathode 16 comprises an electrode 18 and a current collector 20.

The electrode 18 is a layer deposited on the current collector 20.

The electrode 18 is in contact with the electrolyte 12.

Figure 2:
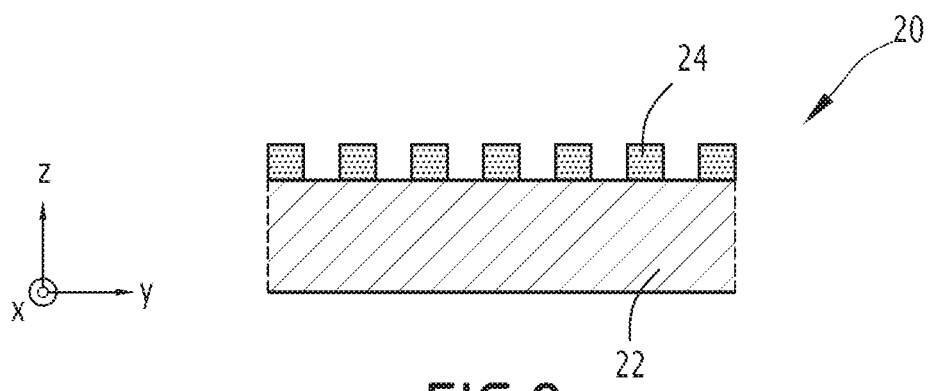
FIG. 2 is a schematic cross sectional view of an example of a current collector forming part of an accumulator represented in FIG. 1 and comprising a grid.

An example of a current collector 20 is represented schematically in FIG. 2.

The current collector 20 comprises a substrate 22 and a grid 24 in contact with the substrate 22.

The substrate 22 is a planar layer, that is to say a layer that extends primarily in one plane.

The direction perpendicular to the plane is the direction of stacking. The stacking direction is symbolised by an axis Z in FIG. 2. Also, the stacking direction is denoted as stacking direction Z in the following. For the sake of convenience, two transverse directions corresponding to the axes X and Y are also defined in FIG. 2, each of the transverse directions being perpendicular to the stacking direction Z and perpendicular to one another. The first transverse direction X is perpendicular to the plane of FIG. 2 while the second transverse direction Y is in the plane of FIG. 2.

Furthermore, by definition, the thickness of a layer or element is the dimension along the stacking direction Z.

The substrate 22 has a thickness that is less than or equal to 18 micrometers ($\mu m$).

The substrate 22 is flexible.

The term "flexible" is to be understood in this context as meaning that the substrate 22 is more flexible than a metal substrate.

The substrate 22 is made of a first material M1.

The first material M1 comprises a polymer or a mixture of polymers.

In the following, for simplicity, the term "a polymer" is used to signify both a single polymer and a mixture of polymers.

The first material M1 is or consists of a polymer.

In some embodiments, the polymer is porous.

By way of a variant, the first material M1 is paper or a fabric.

By way of example, the first material M1 is poly (ethylene terephthalate) also referred to as PET.

More generally, the first material M1 is at least one material selected from the group consisting of the following compounds: polyacrylates (AA); acrylonitrile-butadiene-styrene (ABS); ethylene vinyl alcohol (E/VAL); fluorinated ethylene propylene (FEP); perfluoroalkoxy (PFA); chlorotrifluoroethylene (CTFE); high impact polystyrene (HIPS); melamine formaldehyde (MF); liquid crystal polymers (LCP); polyacetal (POM); acrylo nitrile (PAN); phenol-formaldehyde plastic (PF); polyamide (PA); polyamide-imide (PAI); polyaryl ether ketone (PAEK); polyether ether ketone (PEEK); cis 1,4-polybutadiene (PBD); trans 1,4-polybutadiene (PBD); poly 1-butene (PB); poly butylene terephthalate (PBT); poly caprolactam; polycarbonate (PC); polycarbonate/acrylonitrile butadiene styrene (PC/ABS); poly 2,6-dimethyl-1,4-phenylene ether (PPE); polydicyclopentadiene (PDCP); polyester (PL); polyether ether ketone (PEEK); poly etherimide (PEI); polyethylene (PE); low-density polyethylene (LDPE); medium-density polyethylene (MDPE); high density polyethylene (HDPE); ultra high density polyethylene (UHDPE); polyethylenechlorinates (PEC); poly(ethylene glycol) (PEG); polyethylene hexamethylene dicarbamate (PEHD); polyethylene oxide (PEO); polyethersulfone (PES); polyethylene sulphide (PES); polyethylene terephthalate (PET); phenolics (PF); poly hexamethylene adipamide (PHMA); poly hexamethylene sebacamide (PHMS); polyhydroxyethyl methacrylate (HEMA); polyimide (PI such as KAPTON); polyisobutylene (PM); polyketone (PK); polylactic acid (PLA); poly methyl methacrylate (PMMA); poly methyl pentene (PMP); poly m-methyl styrene (PMMS); poly p-methyl styrene (PPMS); polyoxymethylene (POM); poly pentamethylene hexamethylene dicarbamate (PPHD); poly(m-phenylene); isophthalamide (PMIA); polyphenylene oxide (PPO); poly p-phenylene sulphide (PPS); poly p-phenylene terephthalamide (PPTA); polyphthalamide (PTA); polypropylene (PP); poly propylene oxide (PPDX); poly styrene (PS); polysulfone (PSU); poly tetrafluoro ethylene (PTFE); poly (trimethylene terephthalate) (PTT); polyurethane (PU); polyvinyl butyral (PVB); polyvinyl chloride (PVC); polyvinylidene chloride (PVDC); polyvinylidene fluoride (PVDF); poly vinyl methyl ether (PVME); poly(vinyl pyrrolidone) (PVP), silicone (SI); styrene-acrylonitrile resin (SAN); thermoplastic elastomers (TPE); thermoplastic polymers (TP), and urea-formaldehyde (UF).

Advantageously, the first material M1 can be used for temperatures up to 160° C.

The use of other first materials M1 makes it possible to reinforce such a property of stability at high temperature, for example up to a temperature of 300° C.

For example, the first material M1 is a polymer comprising at least one amide functional group and/or at least one imide functional group.

From a functional point of view, the grid 24 serves as a conductive network.

Structurally, the grid 24 is an element that delimits the interior zones.

According to the illustrated example, the zones correspond to holes.

By way of a variant, the zones are made of the same material as the grid 24 and have a thickness that is less than that of the grid 24.

The grid 24 is a tiling constituted of an elementary pattern, that is to say, the repetition of an elementary pattern over the entire expanse of the grid.

A plurality of shapes of grids 24, and in particular a plurality of elementary patterns, can be envisaged with reference to FIGS. 3 to 8.

Figure 3:
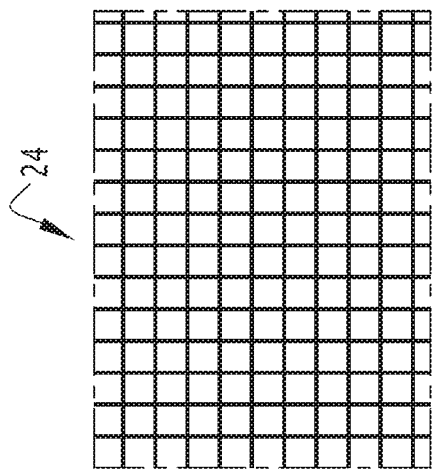
FIGS. 3 to 8 are schematic views of examples of the grids of the current collector of FIG. 2 viewed from above.
Figure 4:
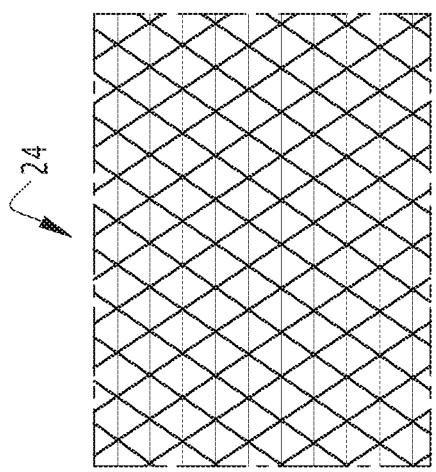
Figure 5:
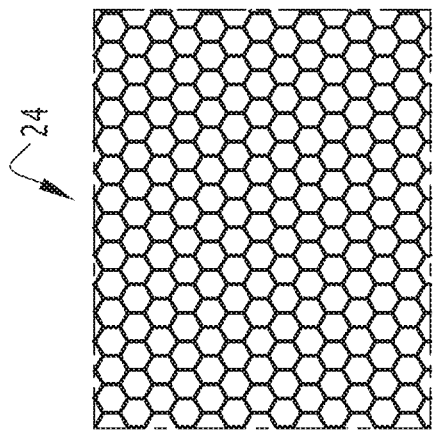
Figure 6:
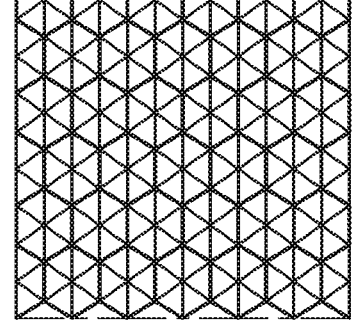
Figure 7:
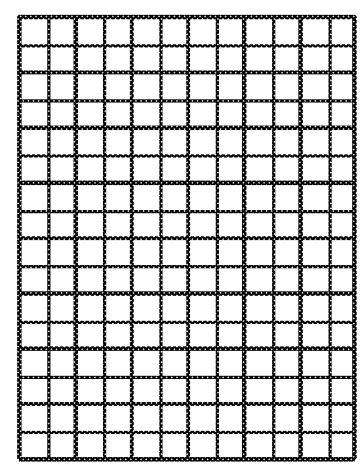
Figure 8:
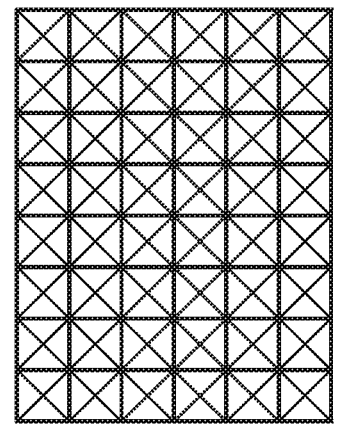

The elementary pattern in FIG. 3 is a square, the elementary pattern in FIG. 4 is a triangle, the elementary pattern in FIG. 5 is an alveolus, the elementary pattern in FIG. 6 is an alveolus whose opposite vertices are connected by segments, the elementary pattern in FIG. 7 is a square of which the middles of opposite sides are connected by segments, and the elementary pattern in FIG. 8 is a square provided with diagonals.

More generally, the elementary pattern is a finite set of points, some points of which are connected by segments.

The grid 24 has a thickness that is less than or equal to 15 micrometers, advantageously less than 5 micrometers, preferably less than 3 micrometers.

The grid 24 is made of a second material M2.

The grid 24 is deposited in the form of a liquid ink or first composition C1.

The grid 24 is thus deposited on the substrate 22.

Said first composition C1 comprises the second material M2 (the second material M2 may be in the presence of additional elements such as binders, the entirety thereof forming the first composition C1) which is selected from among:
 electrically conductive metals and alloys, in particular gold, silver, copper, aluminium, nickel, palladium, platinum, titanium, iron, zinc, manganese, chromium, vanadium, or stainless steel; and
 metal oxides such as copper-, aluminium-, indium-, and tin oxide, fluorinated tin oxide, tin oxide, and zinc oxide or a mixture thereof.

More preferably, the first composition C1 comprises metal particles.

According to the example described, the first composition C1 comprises metal particles.

Such particles may have any type of shape. Preferably, the particles are spherical.

For each particle, a diameter is defined as the maximum distance between two points on the surface of the particle.

The diameter is, for example, measured by a laser granulometry technique.

The laser diffraction particle size measurement technique measures particle size distribution by measuring the angular variation in scattered light intensity as a laser beam passes through a sample of dispersed particles. Large particles scatter light at small angles to the laser beam, and small particles scatter light at higher angles.

Among the particles of the first composition C1, the diameter of each particle is less than or equal to 100 microns.

Preferably, the particles are nanoparticles.

Nanoparticles are particles of which each dimension is less than 100 nanometers.

The first composition C1 is deposited on the substrate 22 by printing methods including in particular screen printing, flexography, gravure, offset or inkjet printing, which makes it possible to apply coatings of compositions based on metal particles.

The operation of the accumulator 10 is in accordance with the operation of an electrochemical accumulator of the state of the art.

By way of a brief summary, the collector 20 is formed of a relatively thin substrate 22 of polymer and a conductive layer of metal nanoparticles in the form of a grid 24 with a relatively small thickness.

As a result thereof, such a collector 20 enables obtaining a saving in terms of the material deposited on the substrate 22, which makes it possible to reduce the mass.

The gain with respect to mass is also derived from the substrate 22 which is a polymeric material instead of a metal sheet. Indeed, the density of a metal is at least two times greater than the density of a polymeric material. For example, the density of copper is 8.9 g/cm³ (grammes per cubic centimetre) while the density of PET is 1.3 g/cm³.

This makes it possible to obtain a collector 20 that is thinner, lighter and more flexible than the standard current collectors while also maintaining a good degree of electrical conductivity of the collector 20.

In addition, the flexibility provided by the use of a printed polymer substrate makes it possible to envisage a substrate that is thinner and more resistant to the constraints associated with the use thereof.

The use of metal particles also makes it possible to reduce the mass because the metal density is lower in the composition C1.

In addition, the result is a reduced thickness for the grid 24, especially with respect to deposible and sufficiently conductive metal sheets that do not have a thickness of less than 3 µm.

Still with respect to a metal sheet, the proposed deposition mode and the use of metal particles provide greater flexibility. On the one hand, several patterns of different shapes or meshes are possible for the grid 24 and, on the other hand, more types of materials and compositions C1 are accessible.

This makes it possible to envisage optimizing the properties of the current collector 20, in particular in terms of conductivity, adhesion to the substrate 22 or weight by a simple variation of the properties of the grid 24.

It should be noted, moreover, that the one or more binders forming the binding material serving to bind the metal particles also makes it possible to facilitate the adhesion of the gate 24 to the substrate 22.

Thus, it could be possible to obtain a current collector 20 that is adapted so as to operate at a higher energy density.

This property has been experimentally demonstrated by the Applicant as appears in the "experience" section.

In addition, such a collector is easy to manufacture. This becomes apparent in particular in describing an exemplary operational implementation of an example of method for manufacturing the collector 20.

The manufacturing method includes the depositing of the grid over the substrate by using a printing technique, in particular rotary screen printing.

Figure 9:
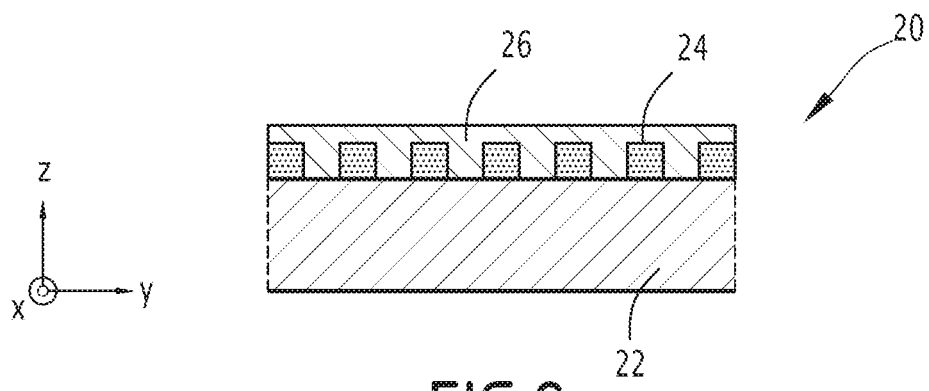
FIG. 9 is a schematic cross sectional view of another example of a current collector forming part of an accumulator represented in FIG. 1.

Another example of a current collector 20 is illustrated in FIG. 9.

The current collector 20 also comprises a substrate 22 and a grid 24.

The remarks relating to the substrate 22 and to the grid 24 of the current collector 20 shown in FIG. 2 are also applicable for the substrate 22 and the grid 24 of the current collector 20 shown in FIG. 9. These remarks are not repeated in the following.

The current collector 20 further comprises a coating layer 26, the coating layer 26 being in contact with the grid 24 and forming a stack of layers superposed with the substrate 22 along a stacking direction Z.

The coating layer 26 has a thickness of less than or equal to 10 µm, advantageously less than 5 µm, and preferably less than 2 µm.

In some cases, the coating layer 26 has a thickness that is less than the thickness of the grid 24 in a manner such that the grid 24 is apparent.

The stack is constituted of the grid 24 and the coating layer 26 superposed thereupon, this stack has a thickness that is less than or equal to 15 µm, preferably less than 3 µm.

The coating layer 26 is made according to or based on a second composition C2.

The second composition C2 comprises a conductive material MC and a binder material ML.

The second composition C2 consists of a conductive material MC and a binder material ML.

The selection of the binder material ML may vary considerably as long as the binder material ML is inert with respect to the other materials of the second composition C2. The binder material ML comprises one or more polymers selected from among thermoplastic polymers, thermosetting polymers, elastomers and the mixtures thereof.

Examples of thermoplastic polymers include, but are not limited to: polymers derived from the polymerisation of aliphatic or cycloaliphatic vinyl monomers, such as polyolefins (including polyethylenes or polypropylenes); polymers derived from the polymerisation of vinyl aromatic monomers, such as polystyrenes, polymers derived from the polymerisation of acrylic monomers and/or (meth) acrylates; polyamides; polyetherketones; polyimides; polyvinyl alcohols; fluorinated polymers, and polyacrylonitrile.

Examples of thermosetting polymers include, but are not limited to, thermosetting resins (such as epoxy resins, polyester resins) optionally in mixture with polyurethanes or with polyether polyols or vice versa.

Examples of elastomeric polymers include, but are not limited to, natural rubbers, synthetic rubbers, styrene-butadiene copolymers (also known by the abbreviation "SBR"), ethylene-propylene copolymers (also known by the abbreviation "EPM"), silicones.

The binder material ML comprises or is a mixture of thermoplastic polymer(s), thermosetting polymer(s) and/or elastomeric polymer(s).

Other suitable binder material ML include crosslinked polymers, such as those made from polymers having carboxyl groups and crosslinking agents.

It should be noted that the remarks that have just been made for the binding material ML of the second composition C2 are also valid for the case where the first composition C1 comprises metal particles and a binder material, including in the embodiment where the coating layer 26 is absent.

In particular, the binder material of such a first composition C1 comprises one or more polymers chosen from thermoplastic polymers, thermosetting polymers, elastomers and mixtures thereof.

The content of binder material ML is greater than or equal to 30% by weight. The weight content or content by weight of an element X in a mixture is the ratio between the weight of the element X and the weight of all of the elements in the mixture.

Preferably, the content of binder material ML is less than or equal to 80% by weight.

Advantageously, the content of binder material ML is between 40% by weight and 70% by weight.

The conductive material MC comprises one or more types of conductive elements to enhance the electronic conductivity.

Examples of conductive elements include, but are not limited to, conductive carbons, carbon black, graphites, graphenes, carbon nanotubes, activated carbon fibers, non-activated carbon nanofibers (a nanofiber is a fiber having a dimension inferior to 1 µm), metal flakes, metal powders, metal fibers and electrically conductive polymers.

The content of the second conductive material MC is greater than or equal to 20% by weight.

Preferably, the content of the second conductive material MC is less than or equal to 70% by weight.

Advantageously, the content of the second conductive material MC is between 30% by weight and 60% by weight.

The operation of the current collector 20 according to the second embodiment is similar to the operation of the current collector 20 according to the first embodiment.

The coating layer 26 is a layer intended to protect the grid 24.

More precisely, the coating layer 26 prevents degradation of the metal particles in contact with corrosive components such as the electrolyte, the active charges or the solvents.

This also makes it possible in particular to prevent the dissolution of the metal particles in the other components of the accumulator.

On the other hand, the coating layer 26 makes it possible to improve the adhesion and the interface between the layer of active material and the current collector 20.

The improvement of such a contact makes it possible to increase the electrical conductivity of the electrode. This implies that it becomes possible to further reduce the thickness or increase the surface area of the interior zones of the grid 24, resulting in a decrease in the amount of materials involved in the manufacture of the collector 20 and thereby a reduction in the cost of manufacturing.

It should also be noted that the protective capability of the coating layer 26 makes it possible to envisage materials for the grid 24 which could not otherwise have been used in the absence of the coating layer 26 on account of the risk of corrosion.

It is thus then possible to benefit from the additional advantages provided by the use of metal particles having enhanced properties.

It may also be envisaged to propose that the grid 24 be made with a plurality of metallic materials, which would make it possible to reduce the cost price of the materials while also preserving, or indeed even improving, the electrical conductivity of the current collector 20.

The use of the coating layer 26 also makes it possible to produce the grid 24 out of metal particles coated or plated with another metal. A particular example is aluminium or copper particles coated with silver. Such metal particles present improved electrical conductivity.

Such a collector 20 is easy to manufacture as it becomes apparent in describing an exemplary carrying out of an example of the method for manufacturing the collector 20.

The method for manufacturing, in addition to the preceding steps, includes an additional step for forming the coating layer 26.

The step for forming includes a step of providing a second composition C2 and a step of coating application.

The step for forming is, for example, carried out by a coating technique of the second composition C2 applied to the substrate 22 provided with the grid 24. The step of forming the coating layer 26 is preferably made by a technique of roller coating or printing using a wet process, in particular selected from slot-die, rotogravure, screen printing and flexography.

The method for manufacturing is fast and economical.

Other embodiments may also be envisaged.

By way of a variant, the current collector 20 is part of a supercapacitor instead of an electrochemical accumulator.

In particular, the supercapacitor is a supercapacitor with aqueous, organic and ionic liquid based electrolyte.

More generally, the current collector 20 is advantageously used in an electrical energy storage device.

EXPERIENCES

Experiments were conducted by the Applicant to compare two current collectors.

The first current collector is a current collector comprising an aluminum sheet having a thickness of 20 microns coated with a coating layer. The coating layer is made of a carbon-based material. More specifically, the material of the coating layer comprises 70% by weight of thermoplastic polymer and 30% by weight of carbon black. The thickness of the coating layer after drying of the coating is between 1 μm and 1.5 μm.

The first current collector does not have a grid.

The second current collector 20 is a current collector 20 according to FIG. 9.

The first material M1 of the substrate 22 is PET. The thickness of the substrate 22 is 18 μm.

The grid 24 is made with the pattern of FIG. 8. The second material M2 is an ink comprising 50 to 60% by weight of silver nanoparticles and a binder.

The second composition C2 is identical to the composition used to form the coating layer in the case of the first current collector.

The grid 24 and the coating layer 26 have a thickness of 3.5 microns.

With each of the current collectors, an electrochemical cell is formed.

The first electrochemical cell is thus formed of the first current collector, a positive electrode, a separator, a negative electrode, an aluminium current collector.

Similarly, the second electrochemical cell is formed of the second current collector, a positive electrode, a separator, a negative electrode, an aluminium current collector.

In each case, the positive electrode is made from an active material coated with carbon and a binder. The active material is $LiFePO_4$ coated with black carbon and the binder is polyvinylidene fluoride also known as PVDF.

The separator is a polypropylene membrane. The membrane is impregnated with lithium hexafluorophosphate electrolyte in ethylene carbonate and diethyl carbonate (also known as LiPF6 EC DEC.

The negative electrode is made of $Li_4Ti_5O_{12}$ (LTO).

The aluminium current collector is in the form of a sheet.

This thus makes it possible to obtain a first electrochemical cell to be compared with a second electrochemical cell.

Each electrochemical cell is of the strain bag type and is positioned inside an aluminized flexible envelope-type container.

The electrochemical performances of the two cells were characterized by a VMP3 multipotentiostat (Biologic).

Three training cycles between 2.05 volts (V) and 1.0 volts at the C/10 speed (C/n corresponds to the current level used to (un)load a battery to its maximum capacity in n hours). were performed to form the solid electrolyte interphase layer (also referred to as SEI) on the negative electrode and to ensure that both electrodes are fully functional. The C/10 speed was calculated using the theoretical capacity.

Then, the two cells were recycled at 50% state of charge (often referred to as "SOC", which means "state of charge") and left standing for 1 hour to ensure a stable potential.

Electrochemical impedance spectroscopy spectra (also referred to as EIS) were then recorded over the frequency range of 500 kiloHertz (kHz) to 10 milliHertz (mHz) at an amplitude of 5 milliVolts (mV).

Electrochemical impedance spectroscopy is a technique used to study, among other things, the electrochemical and physical phenomena at the current/electrode/electrolyte collector interfaces of the electrochemical cell.

Electrochemical impedance spectroscopy is based on the study of the transfer function of these electrochemical systems under stationary and linear conditions. To be placed in such conditions with non-linear systems, a small amplitude perturbation is applied around the supposedly stationary operating point (equilibrium system).

In the experiments carried out by the Applicant, the impedance measurements were performed by applying a sinusoidal potential perturbation of an amplitude of 5 mV around the equilibrium voltage of the electrochemical cell corresponding to the potential difference between the two electrodes when the cell is at rest.

It should be noted that the representation of the impedance in the Nyquist plane makes it possible to highlight the various phenomena involved in the cells studied.

Indeed, the impedance spectra correspond to the different contributions within an electrochemical cell and are thus the sign of the existence of several phenomena: contact resistance resulting from the assembly of the electrochemical cell and the current collector, resistance of charge transfer or diffusion of Li+ ions within the electrodes. In order to compare the resulting resistances of the current collector, the difference between two different frequency points corresponding to the width of the semicircle obtained by all the contributions mentioned above is measured, which enables to obtain a resistance also called impedance.

Then, a study of the discharge capability was carried out by discharging the cells between C/10 and C, the charge of the cells was fixed at the same regime as the discharge respectively.

The experimental protocol led to the results that follow.

The second cell has a lower impedance (16.64 $\Omega \cdot cm^2$) than that of the first cell (24.72 $\Omega \cdot cm^2$). Since the electrolyte, the positive electrode layer and the negative electrode are identical, only the contribution of the current collector 20 makes it possible to explain the improvement of the impedance.

In addition, electrical measurements were made from the results of the capability study between C/10 and C.

The values obtained are reproduced in the following:

| Considered cell | Power Density (W/grammes of électrode) | Energy Density (Wh/grammes of électrode) |
|---|---|---|
| First cell | 0.0099 | 0.1317 |
| | 0.0199 | 0.1198 |
| | 0.0497 | 0.0887 |
| | 0.0996 | 0.0437 |
| Second cell | 0.0119 | 0.1532 |
| | 0.0239 | 0.1388 |
| | 0.0599 | 0.0995 |
| | 0.1188 | 0.0526 |

The previous table (which gives the values of the Ragone diagram) shows that the mass density of energy is better for the second cell compared to the first cell. This highlights the gain provided by the lightness of the current collector 10. The advantage may be more pronounced in the case of the use of a current collector 10 both anode and cathode.

Moreover, the results demonstrate the improvement of the electrochemical performance of the electrochemical cells comprising the current collector 10 induced by the gain in mass obtained thanks to the current collector 10.

The invention claimed is:

1. Current collector comprising:
a substrate, the substrate being made of a first material, the first material comprising a polymer, and
a grid deposited on the substrate, the grid being made of a second material, the second material comprising metal particles.

2. Current collector according to claim 1, wherein the second material comprises at least one element selected from the list consisting of:
electrically conductive metals and alloys; and
metal oxides.

3. Current collector according to claim 1, wherein the grid is the repetition of a pattern.

4. Current collector according to claim 1, wherein the current collector further comprises a coating layer, the coating layer being in contact with the grid and forming a stack of layers superposed with the substrate along a stacking direction.

5. Current collector according to claim 4, wherein the coating layer is made according to a second composition, the second composition comprising of a conductive material and a binder material, the conductive material comprising at least one element selected from the list consisting of:
carbon,
carbon black,
graphite,
graphene,
a carbon nanotube,
an activated carbon fiber,
a non-activated carbon nanofiber,
a metal flake,
a metal powder,
a metal fiber, and
an electrically conductive polymer.

6. Current collector according to claim 5, wherein the content by weight of binder material is greater than or equal to 30%.

7. Current collector according to claim 5, wherein the content by weight of conductive material is greater than or equal to 20%.

8. Current collector according to claim 5, wherein the binder material consists of one or more polymers.

9. Current collector according to claim 5, wherein either the entire assembly of the coating layer and the grid has a thickness that is less than or equal to 15 micrometers or the stack constituted by the grid and the coating layer has a thickness that is less than or equal to 15 micrometers.

10. Current collector according to claim 1, wherein the first material (M1) is selected from the group consisting of:
a polymer comprising at least one amide functional group;
a polymer comprising at least one imide functional group;
a polymer comprising at least one imide functional group and one amide functional group;
poly(phenylene ether ether ketone); and
poly(ethylene naphthalate).

11. Assembly forming an anode or a cathode comprising:
an electrode, and
a current collector according to claim 1.

12. Electrical energy storage device, electrochemical accumulator or supercapacitor, comprising an assembly according to claim 11.

13. Method for manufacturing a current collector including;
a step of providing a substrate, the substrate being made of a first material, the first material comprising a polymer, and
a step of depositing a grid deposited on the substrate, the grid being made of a second material, the second material comprising metal particles.

14. Method for manufacturing a current collector according to claim 13 comprising an additional step for depositing a coating layer in contact with the grid, the coating layer being produced by depositing a composition comprising a conductive material and a binder material.

15. Method for manufacturing a current collector according to claim 13, wherein at least one of the depositing steps is carried out by a printing technique.

\* \* \* \* \*